United States Patent [19]

Williams

[11] 4,342,296
[45] Aug. 3, 1982

[54] ROTARY INTERNAL COMBUSTION ENGINE

[76] Inventor: Robert H. Williams, Rte. 2, Box 44, Bandera, Tex. 78003

[21] Appl. No.: 246,400

[22] Filed: Mar. 23, 1981

Related U.S. Application Data

[60] Division of Ser. No. 30,993, Apr. 18, 1979, Pat. No. 4,286,555, which is a continuation-in-part of Ser. No. 956,206, Oct. 30, 1978, abandoned.

[51] Int. Cl.³ .............................................. F02B 53/00
[52] U.S. Cl. ..................................... 123/228; 418/66
[58] Field of Search ................. 123/228, 242; 418/65, 418/67, 66

[56] References Cited

U.S. PATENT DOCUMENTS

| 1,199,489 | 9/1916 | Nield | 123/228 |
| 1,901,417 | 3/1933 | Sleeper | 418/65 |
| 3,882,827 | 5/1975 | Williams | 123/228 |

FOREIGN PATENT DOCUMENTS 1373370  8/1964  France ................... 123/228

*Primary Examiner*—Michael Koczo

[57] ABSTRACT

A rotary internal combustion engine comprising a cylinder in a stator sealed between parallel end plates, a power shaft concentric with the cylinder bore and journaled in bearings in the end walls, an annular eccentric rotor fitted onto the shaft, and an annular piston concentric with and fitted over the rotor making sliding sealing engagement with both end plates. An abutment centered preferably between 10:00 and 10:30 o'clock on the stator seals the space between the cylinder and piston from endplate to endplate and forms the counterclockwise end of a combustion-expansion chamber. A second abutment, centered preferably between 1:30 and 2:00 o'clock, seals the space between the cylinder and piston from endplate to endplate and forms the clockwise end of the combustion-expansion chamber. The combustion chamber centered at 12:00 o'clock comprises a shallow arcuate cavity adjacent the path of the piston and opening into the cylinder. Fuel injection means for the invention engine may be mounted on an endplate in advance of the first abutment or positioned on the end wall at approximately 12:00 o'clock to inject forward directly into the combustion chamber. Various means for admitting compressed air into the combustion-expansion chamber and exhausting the spent gases as well as various types of abutments are also disclosed.

1 Claim, 17 Drawing Figures

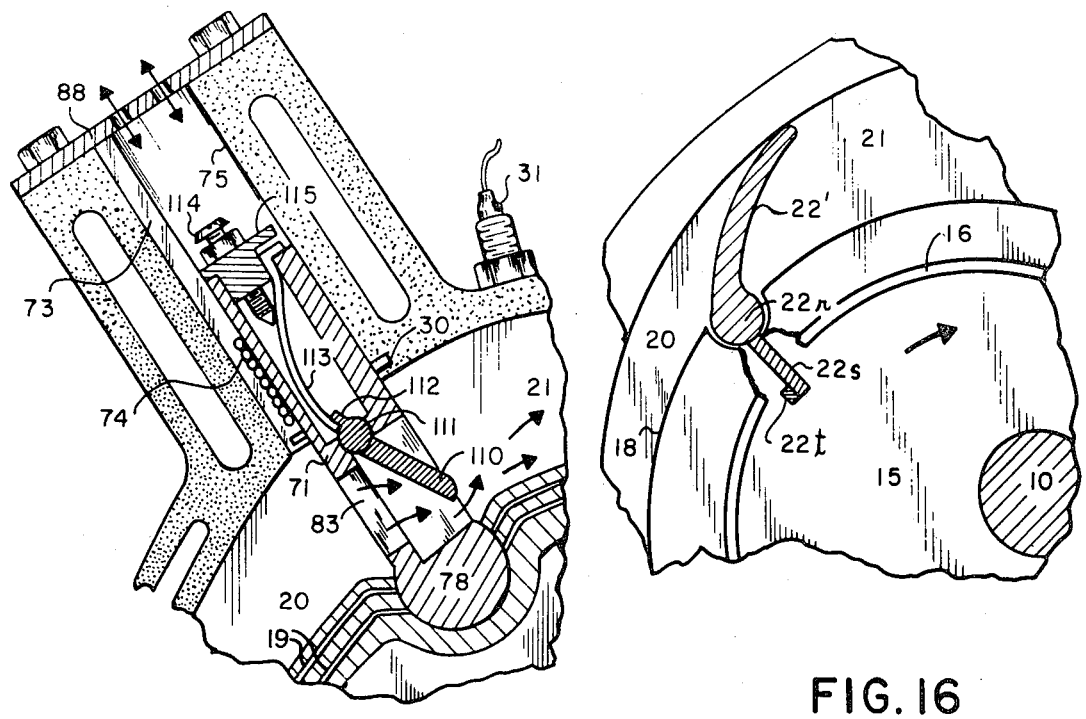
FIG. 15
FIG. 16
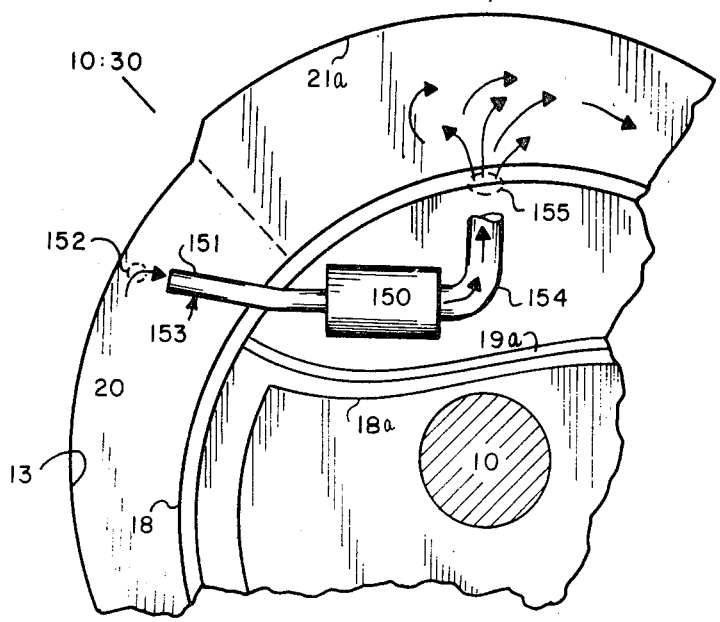
FIG. 17

ROTARY INTERNAL COMBUSTION ENGINE

This patent application is a division of Ser. No. 30,993, filed Apr. 18, 1979, now U.S. Pat. No. 4,286,555, which is a continuation-in-part of Ser. No. 956,206, filed Oct. 30, 1978, now abandoned.

BACKGROUND OF THE INVENTION

Rotary engines have generally suffered from inadequate sealings, short life seals, high friction by seals in rotor scraping the face of the cylinder and the end walls. Some engines are designed such that the cross-sectional area of the combustion expansion chamber broadens as the power stroke advances, thereby allowing gases to expand radially into space where they accomplish no work. Most rotary engine designs also require precompressed fuel, with accompanying losses of energy, especially through loss of heat.

The rotary internal combustion engine of the present invention overcomes the problems of previous rotary engines by providing positive sealing, durable sealing, and sealing with reduced friction. Additionally, advantages of the present invention rotary engine are design simplicity, capability of providing substantial quantities of air without the assistance of a turbocharger, and an expansion chamber that efficiently utilizes combustion gases. Furthermore, the invention engine is suitable for use as a diesel. Additional advantages are suitability to fuel injection with quick acceleration, fuel economy, exceptional power per cubic inch of expansion chamber, and a comparatively clean exhaust.

All of the above advantages are realized by the invention engine by the combination of unique first and second abutments which form the counterclockwise and clockwise ends, respectively, of the expansion-combustion chamber in conjunction with unique exhaust means.

BRIEF DESCRIPTION OF THE PRIOR ART

Rotary engines have generally suffered from inadequate sealing, short life seals, high friction by seals in rotor scraping face of cylinder and scraping end walls. Some suffer from a combustion expansion chamber of such design that its cross-sectional area broadens as the power stroke advances, allowing gases to expand radially into space where they accomplish no work. Most rotary engine designs also require precompressed fuel, with accompanying losses of energy, especially through loss of heat.

The Wankel and other engines patented in recent years have suffered from one or more of these handicaps. The engine in U.S. Pat. No. 3,882,827 requires blade seals which must expand outward from their slots in a rotor under heavy combustion pressures against their sides in order to maintain sealing contact with the cylinder. The industry so far has not been able to make this type of seal function satisfactorily. The Wankel rotary, though it compresses its own fuel, suffers from inadequate sealing, short life seals, friction between seals and cylinder and between rotor and end walls, and especially from loss of energy due to radially broadening of lobed expansion chamber. Because of the shape of the Wankel expansion chamber, in relation to its combustion chamber and to the triangular piston, that rotary, though a simple engine, cannot make the fullest use of the energy released during combustion.

The invention herewith provides positive sealing and sealing which should prove durable, and which performs with much less friction. It inhales a charge of air and compresses it directly into the combustion chamber. It has additional features which should make it a highly competitive engine: it is a simple engine; it provides a great abundance of air without extra machinery such as a turbocharger; and its expansion chamber is such that it must make efficient use of the combustion gases. The automatic availability of two and a half times as much air as a conventional piston engine of equal displacement can inhale most likely will make this rotary adaptable for use as a diesel. The invention engine is well suited to fuel injection with quick acceleration, fuel economy, exceptional power per cubic inch of expansion chamber and a comparatively clean exhaust. It is obviously a high-altitude engine. Manufacturers of internal combustion engines have found that they can boost the power of an internal combustion engine by as much as 40 percent by adding a turbocharger to pump extra air into the cylinders. However, turbochargers are expensive and temperamental and there is a time lag of about three seconds—a very disturbing time lag to an automobile driver in need of a sudden surge of power for passing another vehicle—before said turbocharger provides the power surge. In the rotary design herewith, the needed air is inherently and instantly available to the operator by merely depressing the accelerator pedal—and at no extra cost, for machinery. As for the shape of the expansion chamber, its cross-sectional area in all models actually contracts to some extent as the power stroke advances—something believed to be unique among internal combustion engines. In some models, the contraction is considerable. While this feature remains to be tested, it seems obvious that the concentration of the dissipating gases must of necessity concentrate their heat and hold it longer during the power stroke, and therefore sustain torque longer, which means getting more power out of a given fuel charge, burning up more of the hydrocarbons, leaving a cleaner exhaust. The invention engine is obviously a high torque engine with short stroke and an expansion chamber of large cross section. A cylinder nine inches in diameter by three inches "long" (between end walls) with a piston seven inches in diameter, and the combustion-expansion chamber at the end of the power stroke providing roughly 28 cubic inches volume, should be considerably more powerful than a 56 cubic inch cylinder in a conventional four-phase cycle piston engine, since this rotary produces a power stroke with each revolution and is supercharged with extra air.

Designers of piston engines never are able to find as much room as desirable for intake and exhaust valves; there is always some choking, especially at higher RPM. Both the exhaust port and the port admitting air to the combustion chamber can be proportionately larger in the invention engine. A great wave of air can be swept in.

Another important virtue of this engine is that in a cylinder no larger than seven inches in diameter by two and a half inches between end walls, enough space is available for at least two spark (or glow) plugs in the combustion chamber.

The invention engine is of such design as to adapt well to modular production. Engine horsepower can thus be increased by merely adding one or more cylinders (with proper timing). The modular construction should make it sowewhat easier too for the manufacturer to provide for cutting out of one or more cylinders when the engine is cruising under moderate power. Cutting out some cylinders, letting the engine cruise on fewer cylinders, should normally improve fuel economy, especially in the invention engine, since a cylinder will be more efficient under medium to heavy loads because of the abundance of air available.

Several automatic means of exhausting the spent gases from the expansion chamber can be used requiring no cams or gears, but all such means other than those claimed herein provide ports too small if they are to be closed again automatically before the compression builds up excessively in compression chamber. One such automatic means with an exhaust port in at least one end wall shown and claimed herein can provide a port large enough to be practical when the piston is comparatively large in diameter in relation to the cylinder so that the lip or flange on the edge of the piston, sealing against the end wall, can prevent pressurized cooling oil in the engine from spilling out through the exhaust port when the eccentric piston is in a certain position as will be shown. If the piston is small enough in diameter in relation to the cylinder to provide a big expansion chamber, the flange on the edge of the piston will strike engine shaft—thus limiting the size of the engine when this type of porting is used.

SUMMARY OF THE INVENTION

It is an object of the present invention to provide a rotary internal combustion engine comprising a stator, a power shaft, a rotor, a piston, and first and second abutments which form the counterclockwise and clockwise ends, respectively, of the expansion-combustion chamber of the engine. The first abutment is spring biased downward toward the face of the engine piston with a first end pivotally secured to the stator of the engine, while a second free end makes tangential, sealing engagement with the face of the engine piston during the combustion-expansion stroke of the engine. The second abutment, a rectangular metal plate rigidly affixed to the engine piston and pointing radially outward from the center of the piston, slidably reciprocates in a slot in a pivoting bearing journaled in the engine stator as the engine piston planetates. Means for injecting fuel and air and expelling spent exhaust gases are also provided.

A further object of the present invention is to provide a rotary internal combustion engine comprising a stator, a power shaft, a rotor, a piston, and first and second abutments which form the counterclockwise and clockwise ends, respectively, of the expansion-combustion chamber of the engine and exhaust means for spent gases comprising a poppet valve in the perimeter of the engine combustion chamber. The first abutment is spring biased downward toward the face of the engine piston with a first end pivotally secured to the stator of the engine, while a second free end makes tangential, sealing engagement with the face of the engine piston during the combustion-expansion stroke of the engine. The second abument, a rectangular metal plate rigidly affixed to the engine piston and pointing radially outward from the center of the piston, slidably reciprocates in a slot in a pivoting bearing journaled in the engine stator as the engine piston planetates. Means for injecting fuel and air into the engine are also provided.

BRIEF DESCRIPTION OF THE DRAWINGS

FIG. 15 is a fragmented end view showing an alternate first abutment with inlet port through it and hinged cover over port.

FIG. 16 is a fragmented end view showing an optional type of first abutment comprising a metal plate, slightly arcuate, hinged in face of piston and spring biased against face of cylinder, to close counterclockwise end of combustion chamber, said spring biasing adjusted to allow said plate to spring open when pressure of air building up in compression chamber reaches a predetermined psi.

FIG. 17 is a fragmented end view of means for automatically trapping a bit of compressed air from compression stroke and storing it until end of expansion stroke, then releasing it into combustion-expansion chamber, just as exhaust port opens, to scavenge engine.

DESCRIPTION OF THE PREFERRED EMBODIMENT

Figure 1:
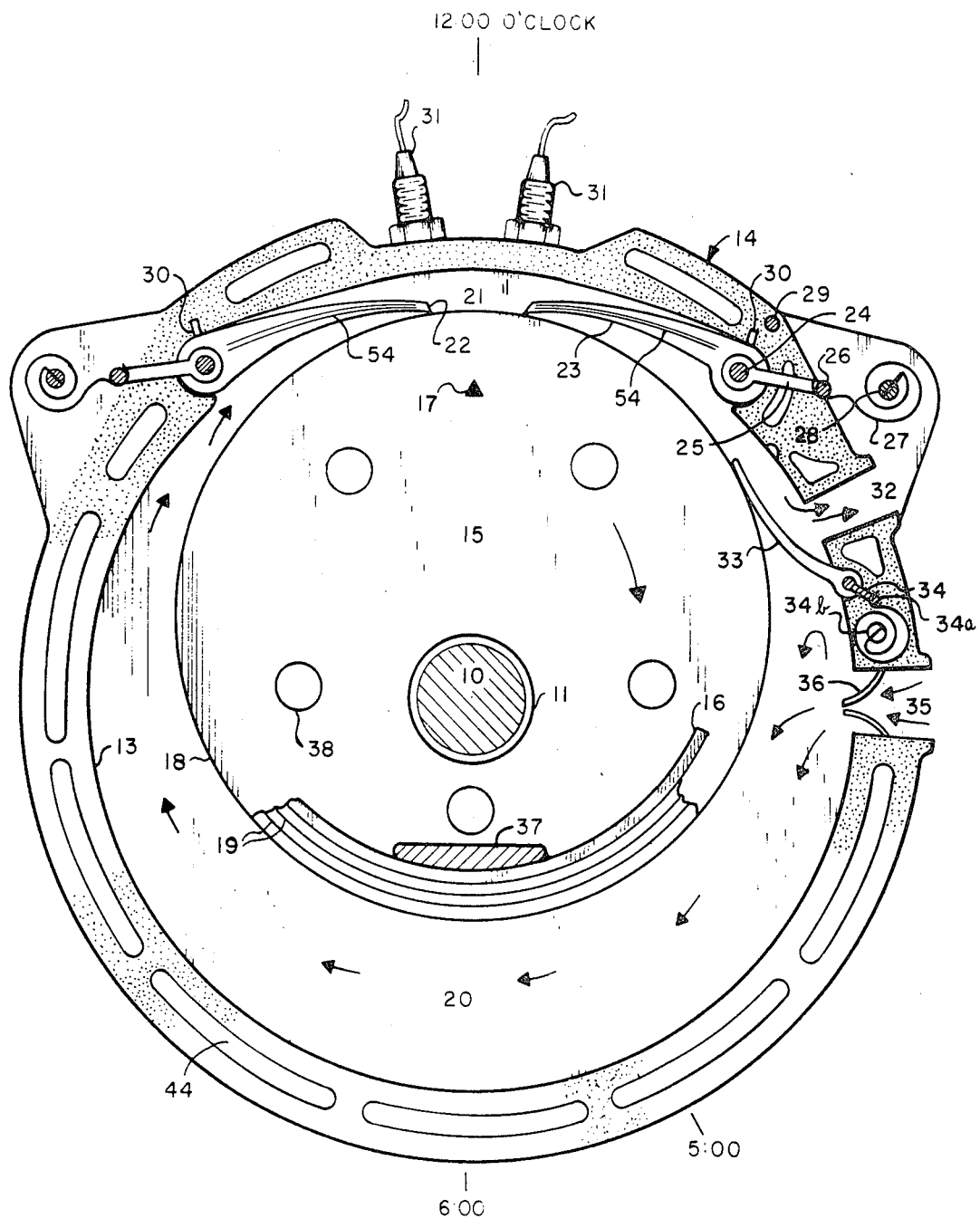
FIG. 1 is an end view (with end plate removed) of one version of the invention engine with piston head at 12:00 o'clock, the point of maximum compression.

An engine shaft 10 in bearings 11 is journaled in parallel end walls 12 and 12a, the end walls sealing between them a cylinder bore 13 in a stator 14, the bore concentric with engine shaft 10. An eccentric annular rotor 15 is keyed to shaft 10 and positioned midway between the end walls inside the engine. Annular piston 18 is fitted on eccentric rotor 15, concentrically with it, preferably with bearing 16 between rotor 15 and piston 18. At least one end seal 19 is provided on each end of piston 18 to maintain yieldable sliding engagement against end walls 12 and 12a. Rotor 15 and piston 18 have a common head 17 at the point of their longest radius and piston head makes tangential sealing engagement with cylinder 13 throughout a cycle, which is one revolution of the engine shaft. A first abutment 22 positioned preferably near 10:00 o'clock forms a sealing bridge between cylinder 13 and piston 18, from end plate to end plate, and comprises the counterclockwise end of a combustion-expansion chamber 21. A combustion subchamber 21a comprises a shallow arcuate cavity in stator 14 centered about 12:00 o'clock, the cavity being adjacent to but out of the path of piston 18, and communicating with cylinder bore 13. At least one spark plug (or glow plug) 31 is mounted in combustion chamber 21. A second abutment 23 positioned preferably near 2:00 o'clock seals the space between cylinder 13 and piston 18, from end wall to end wall, and forms the clockwise end of combustion-expansion chamber 21. A port 35 in stator 14 at about 3:00 o'clock is fitted with a one-way inlet valve 36 to admit air to engine. Piston head 17 together with second abutment 23 forms an air suction chamber to clockwise of second abutment, and an air compression chamber to clockwise of said piston head. Various means are available for porting combustion-expansion chamber 21, as various types and combinations of first and second abutments may be used, and some of the means of porting for air intake and for exhausting the spent gases are adaptable only with certain types of abutments.

A preferred type of first abutment 22 (FIGS. 1 and 2) comprises a rectangular plate of rigid material, such as aluminum, one end of it with rounded head, which head is journaled in a bore in stator preferably near 10:00 o'clock, the bore parallel to engine shaft 10, the other end of the abutment projecting clockwise and free to swing vertically in chamber 21 between piston 18 and cylinder 13. The cylinder is machined away along the edges of bore 13 to make room for abutment 22 to pivot. Stator 14 is recessed just above abutment 22 to make room for abutment 22 while piston head 17 passes. The lower face of abutment 22 is arcuate on a radius equal to the radius of cylinder 13 to allow abutment 22 to become an extension of the compression chamber as the compression stroke ends. Abutment 22 can be opened automatically by air pressure or it can be lifted by cam 53a keyed to shaft 10 outside the engine, the lifting function performed via cam-following lever 58a which is keyed to a hub 24 on end of abutment pivot head, which hub is journaled in end plate and extends outside to receive lever 58. Pivoting abutment 22 is biased downward toward piston 18 by spring 27 mounted on post 28 on outside of end plate, the spring impinging on knob 26 on free end of arm 25, which arm is keyed to hub 24. Spring tension can also be applied from the side of cylinder bore 13 against stud 22m screwed into pivot head 22b through an opening 22h in stator 14.

A second optional type of first abutment comprises a rectangular hollow abutment 71 (FIG. 15) with rounded head 78 on one end, journaled in piston 18 in a bore parallel to engine shaft 10, the piston recessed on each side of the abutment along edges of the bore to allow the piston to planetate. The abutment is mounted to reciprocate slidably inside a slot 75 in stator 14 pointing radially outward from the center of cylinder 13, abutment 71 provided with a window 83 through which air can be compressed from compression chamber 20 directly into combustion-expansion chamber 21. Plate 110 on hinge 111 is forced open by compressed air in chamber 20 against adjustable tension of spring 113 and is closed again across window 83 by combustion pressures in chamber 21. A friction plate 73 on the side of abutment where wear is heaviest is readily removable for replacement by removing cover plate 88. A fret-like yieldable seal 30 is mounted in a slot in the housing to sweep the face of the reciprocating abutment on its high pressure side.

A third type of optional first abutment closing the counterclockwise end of combustion-expansion chamber 21 (FIG. 16) comprises a rectangular plate of metal 22', preferably lightweight, with rounded head 22r on its inner end, head 22r forming a pivot and journaled in a bore in the face of piston 18 preferably near 10:00 o'clock. Spring bias is applied to a narrow projection 22s on the inside of pivot head 22r, on at least one side between rotor 15 and the end wall, through a narrow slot in piston 18. Spring 22t is anchored on the underside of piston 18 between rotor 15 and the end wall. Plate 22' is somewhat arcuate and flexibly slides against cylinder bore 13 to close counterclockwise end of combustion-expansion chamber 21, yet is yieldable to air pressure in compression chamber 20.

Figures 4, 5:
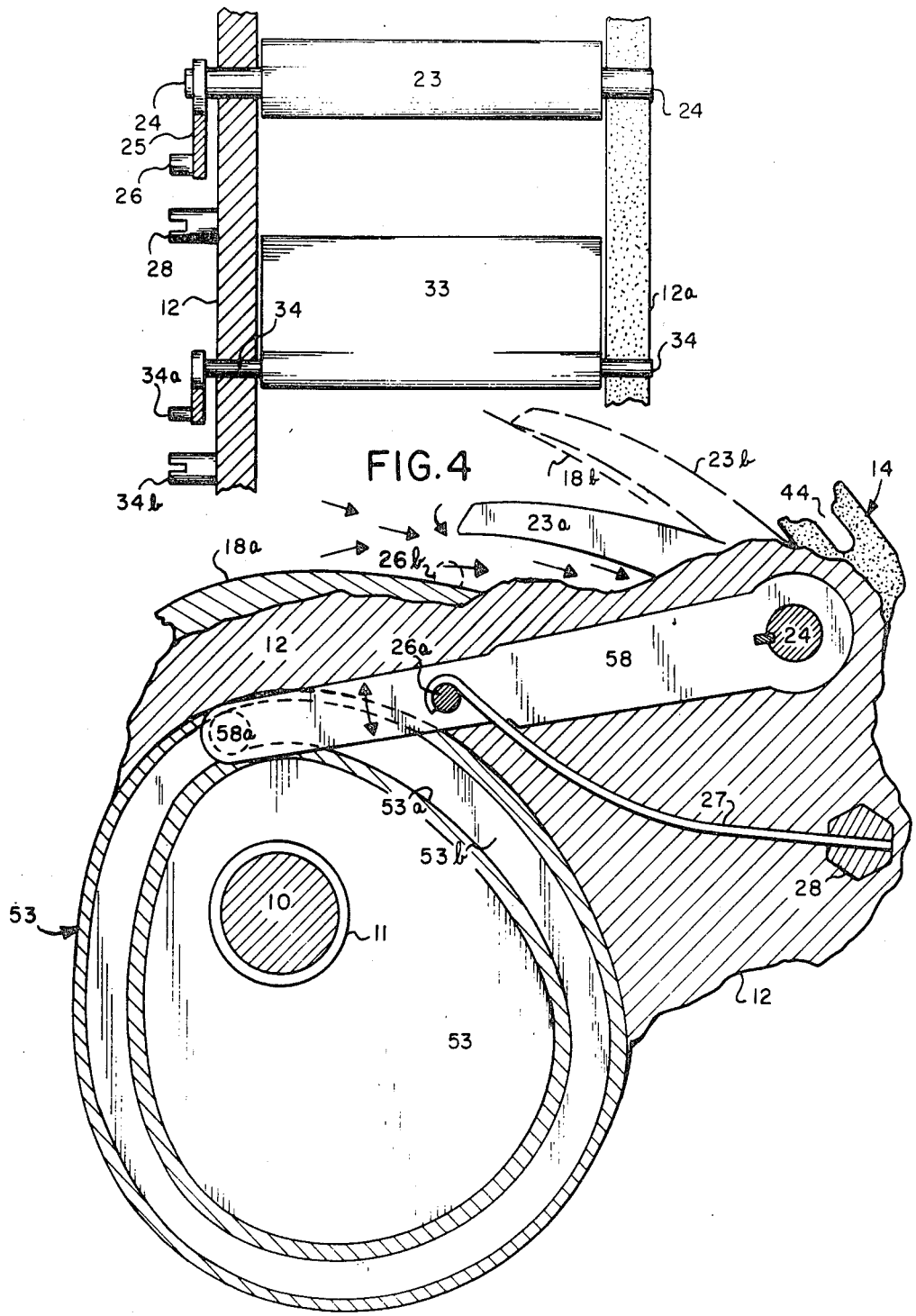
FIG. 4 is a cross-sectional side view showing lever mechanism via which spring tension is applied to second abutment and to exhaust deflector.
FIG. 5 is a fragmented end view showing cam and cam lever outside end wall to lift second abutment from face of piston to vent engine at end of expansion stroke.
Figure 6:
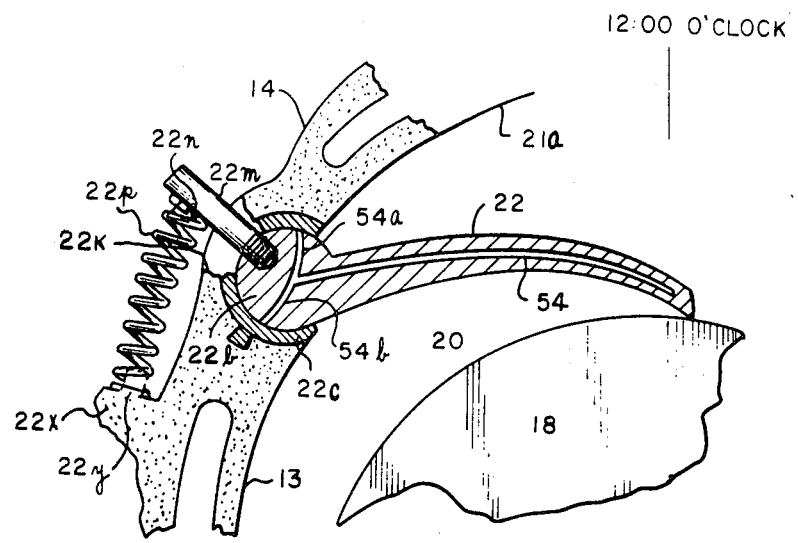
FIG. 6 is a fragmented end view showing an alternate means of applying spring bias to hold first abutment against face of piston.
Figure 7:
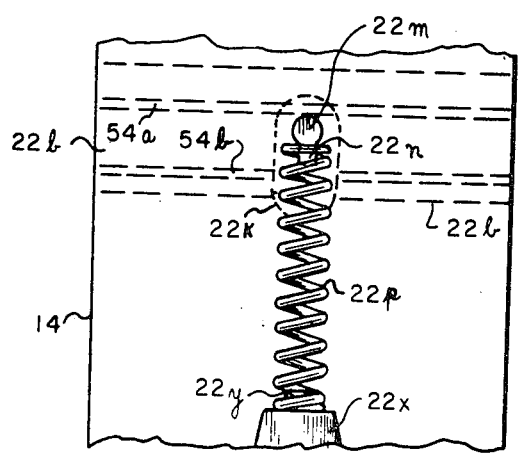
FIG. 7 is a fragmented side view of spring biasing means shown in FIG. 6.

A preferred type of second abutment closing the clockwise end of combustion-expansion chamber 21 comprises a rectangular metal plate 23 (FIGS. 1, 2, etc.) with rounded pivot head 24 journaled in the face of cylinder 13 at about 2:00 o'clock, the other end of plate 23 free to swing in an area inside the space between piston 18 and combustion chamber 21a. Plate 23 is slightly arcuate to conform roughly with cylinder bore 13, its free swinging end held tangentially against the face of piston 18 by spring 27 mounted on post 28 outside end wall 12. Spring 27 bears against knob 26a (FIG. 5) on lever 58 which is keyed to hub 24 on end of pivot head. A cam 53 on engine shaft 10 outside end wall 12 is designed to lift abutment 23 off the face of piston 18 at end of the expansion stroke to let spent gases spill out between abutment 23 and the face of piston 18 into exhaust port 32, cam 53 allowing abutment 23 to close again in time for combustion chamber 21 to receive next charge of compressed air.

An optional type of second abutment (FIGS. 8 and 10) comprises a metal plate 67 rigidly fixed to piston 18 and projecting radially outward from center of piston, plate 67 coextensive with end walls 12 and 12a and preferably fitted with a yieldable rib seal 66 along each edge contacting the end walls, the rib seals connected across the face of the abutment by rib seal 66a. The abutment is mounted slidably through a slotted pivoting bearing 64 in stator 14, optionally with needle bearings 74 along the high friction side of the sliding abutment.

Figure 9:
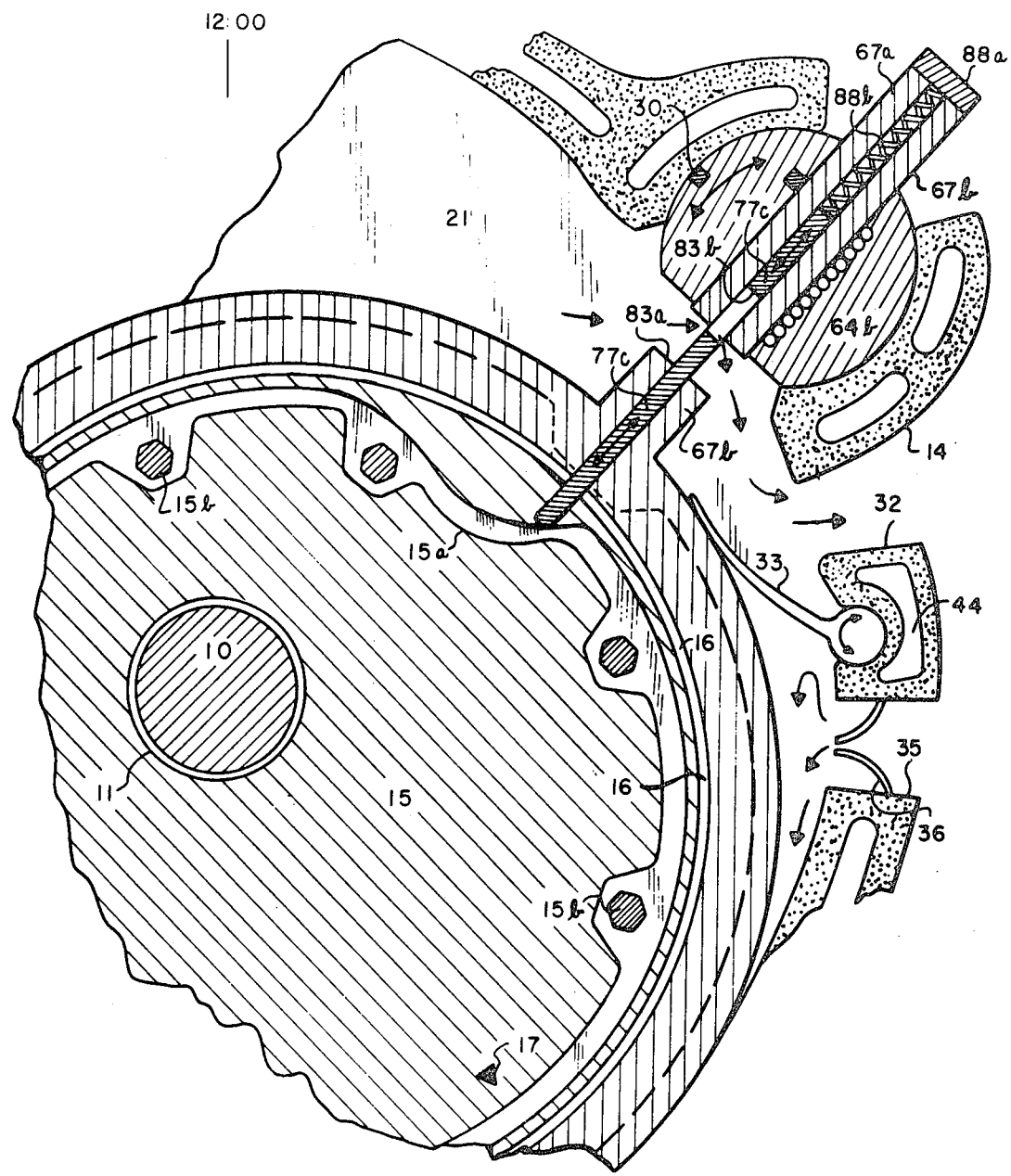
FIG. 9 is a fragmented end view with cam bolted to rotor inside engine, operating a reciprocating sliding plate valve inside hollow abutment, to vent engine at end of power stroke.

Another optional type of abutment, closing counterclockwise end of chamber 21, comprises a hollow abutment 67a (67b) (FIG. 9) rigidly fixed to piston 18 and slidably reciprocating through pivoting bearing 64b in stator 14 centered preferably near 2:00 o'clock. Metal plate 77c slidably mounts in hollow of abutment 67a and 67b while an arm of plate 77c projects through a narrow slot in the face of piston 18 on each side of rotor 15, and bears against a cam 15a bolted to rotor 15 near its perimeter, the plate spring-biased inward, and the cam designed and positioned to permit the plate to slide inward at the end of the expansion stroke to bring a window 83b through plate 77c into mating position with window 83a through the abutment, letting spent gases spill out of expansion chamber 21 into exhaust port 32. Cam 15a is designed to return plate 77c to its original position, closing exhaust port 32 in time for combustion-expansion chamber 21 to receive the next charge of compressed air. Deflector 33 is spring biased against the face of piston 18 to deflect spent gases out via port 32.

Figure 13:
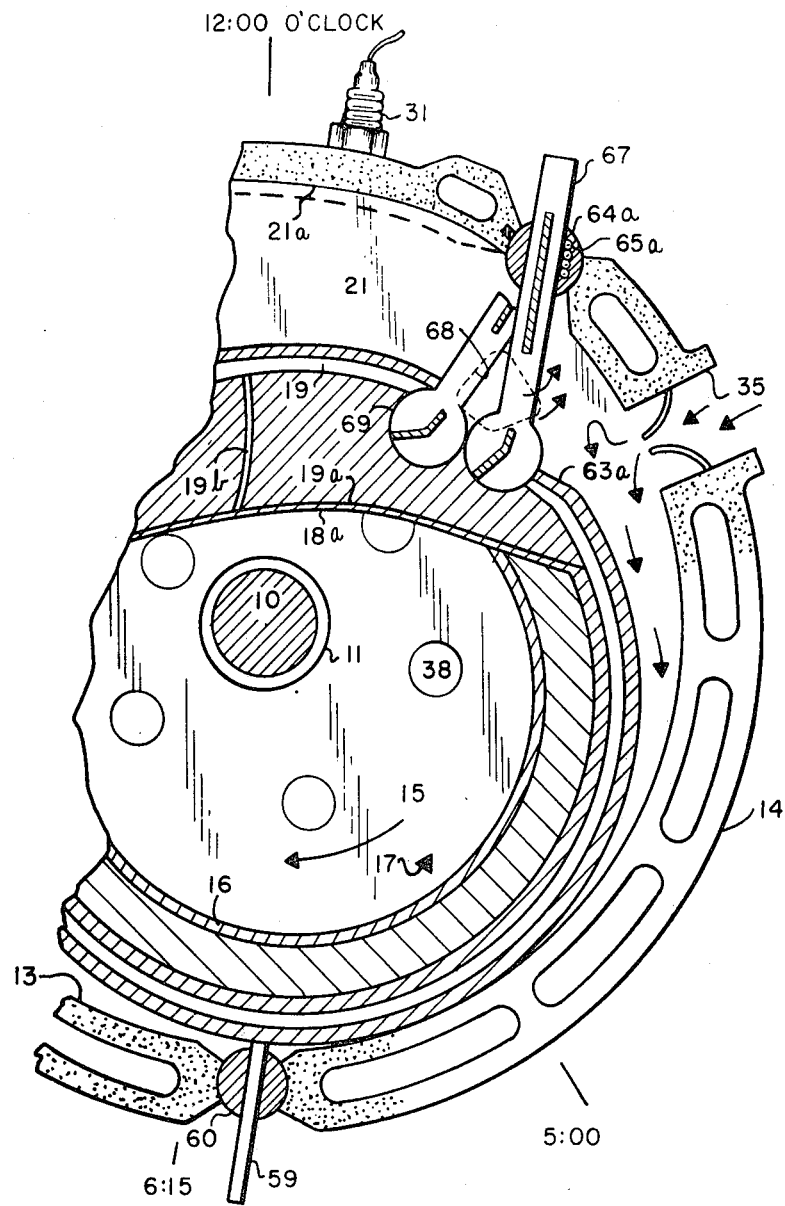
FIG. 13 is a fragmented end view showing an alternate means of exhausting spent gases from engine, in which design the second abutment comprises a plate-plunger pivoted in face of cylinder and slidably reciprocating through a pivoting bearing in housing, piston tethered to housing, preferably by a rod of small diameter of 6:00 o'clock, an exhaust port comprising a hole in at least one end wall so positioned that oscillating second abutment uncovers the hole at end of expansion stroke, covering it again in time for combustion chamber to receive compression charge, and a flange on edge of piston to keep pressurized cooling oil from spilling out through the port in the end wall.

Still another optional type of second abutment, which can be used in an engine wherein the piston is as large as about 21/24th the diameter of the cylinder, and the combustion-expansion chamber therefor comparatively small, comprises a rectangular plate 67 (FIG. 13) with rounded head 69 on its inner end, the head pivotally journaled in a bearing in the face of piston 18, and piston 18 machined away along edges of bore to allow the abutment to flex clockwise and counterclockwise as piston 18 planetates. The abutment is mounted slidably through a slot in pivoting bearing 64a in stator 14. Piston 18 is tethered to cylinder 13, preferably by a rod 59 of small diameter in a pivoting bearing 60 in stator 14 at about 6:00 o'clock. Port 68 in at least one end wall is so positioned that the abutment must pass over it and uncover it at the end of the expansion stroke to let spent gases spill out via exhaust port. A flange 18b along edge of piston 18 and just clearing engine shaft 10 in all positions of the piston, fitted with yieldable seal 19a along its inner edge, prevents pressurized cooling oil from spilling out of the engine.

An optional means of venting the engine at the end of the expansion stroke, other than means already described herein, comprises a poppet valve 9 (FIG. 8) with valve stem 9a through stator 14 in the perimeter of combustion chamber 21a with exhaust port 9b. Poppet valve 9 is operated by a cam not shown.

Another optional exhaust means without need of cams or gears, where piston 18 is tethered by second abutment 67 rigidly fixed to piston 18 (see FIGS. 10, 11 and 12), comprises a sleeve 202 on each side of rotor 15 and attached to the rotor, sleeves 202 virtually coextensive with the end walls 12 and 12a and rotating closely but not engaging the underside of piston 18 with suitable seals acting yieldably against the underside of piston 18. Box 202a on one side of rotor 15 and open at the top receives spent gases at the end of the power stroke when the box passes under and mates with an opening 70a through rotor 15 adjacent to and connecting with the box and connecting into a second box 201' on the opposite side of rotor 15. Second box 201' is elongated in a clockwise direction to pass under the inner end of abutment 67 and deliver spent gases out via port 207' in the face of that side of piston 18, gases thence passing out of engine via exhaust port 32. Yieldable seals in the periphery of sleeves 202 engaging the underside of piston keep both openings in piston 18 closed except while engine is being scavenged.

A means of insuring adequate scavenging of engine even when a minimum of air is allowed to enter compression chamber 20 comprises a small port 152 (FIG. 17) in an end wall near the perimeter of compression chamber 20 and a few degrees counterclockwise of the first abutment. A pipe 151 fitted over port 152 and fitted with a check valve indicated by arrow 153 leads to a small container 150 to store a small amount of compressed air during the compression stroke. A larger pipe 154 leads from storage container 150 to a second port 155 in an end wall. Port 155 is so positioned that it will remain covered by a flange 19a on edge of piston 18 throughout the expansion stroke but will be uncovered just after the exhaust port opens allowing the stored compressed air to spill into the expansion chamber to force out spent gases. The means described herein is entirely automatic.

While certain combinations of first and second abutments are shown in the accompanying drawings, certain other combinations can obviously be used. For example, a poppet valve for exhausting of spent gases can be used with the two pivoting leaf abutments shown in FIG. 1, in which combination the first leaf abutment can be opened by air pressure when pressure reaches a predetermined psi, and the second abutment remains at all times in sealing contact with the face of the piston, and cams outside the end walls are eliminated. Also, the type of second abutment 67a (67b) shown in FIG. 9 can be adapted for use as a first abutment by changing the shape and timing of the cam 15a bolted to rotor 15.

METHOD OF OPERATION

Figure 2:
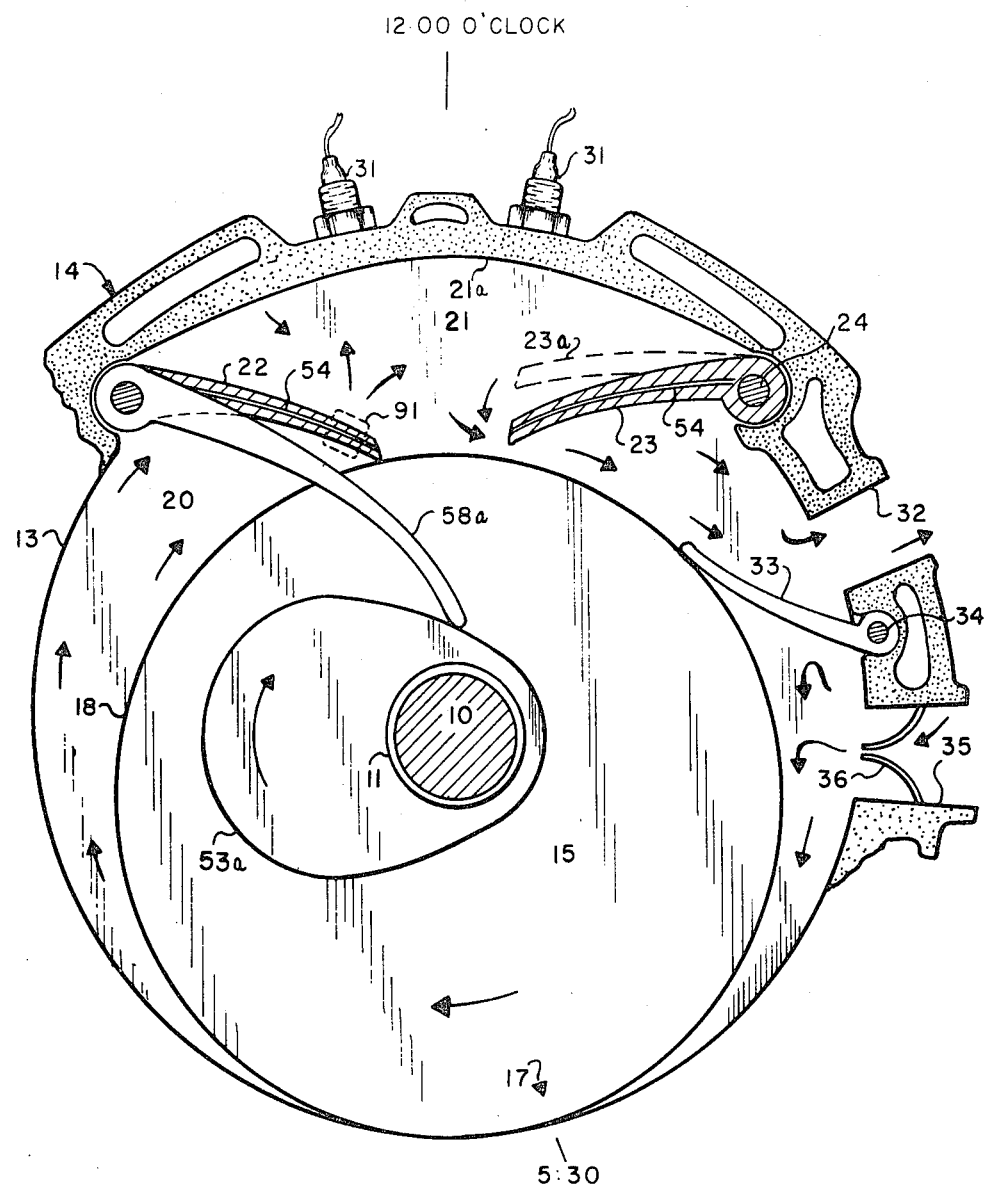
FIG. 2 is a similar end view with piston head at 5:00 o'clock, at end of power stroke, showing a small jet of compressed air allowed into expansion chamber via a cavity in end wall, to scavenge engine immediately after exhaust port begins to open.
Figure 3:
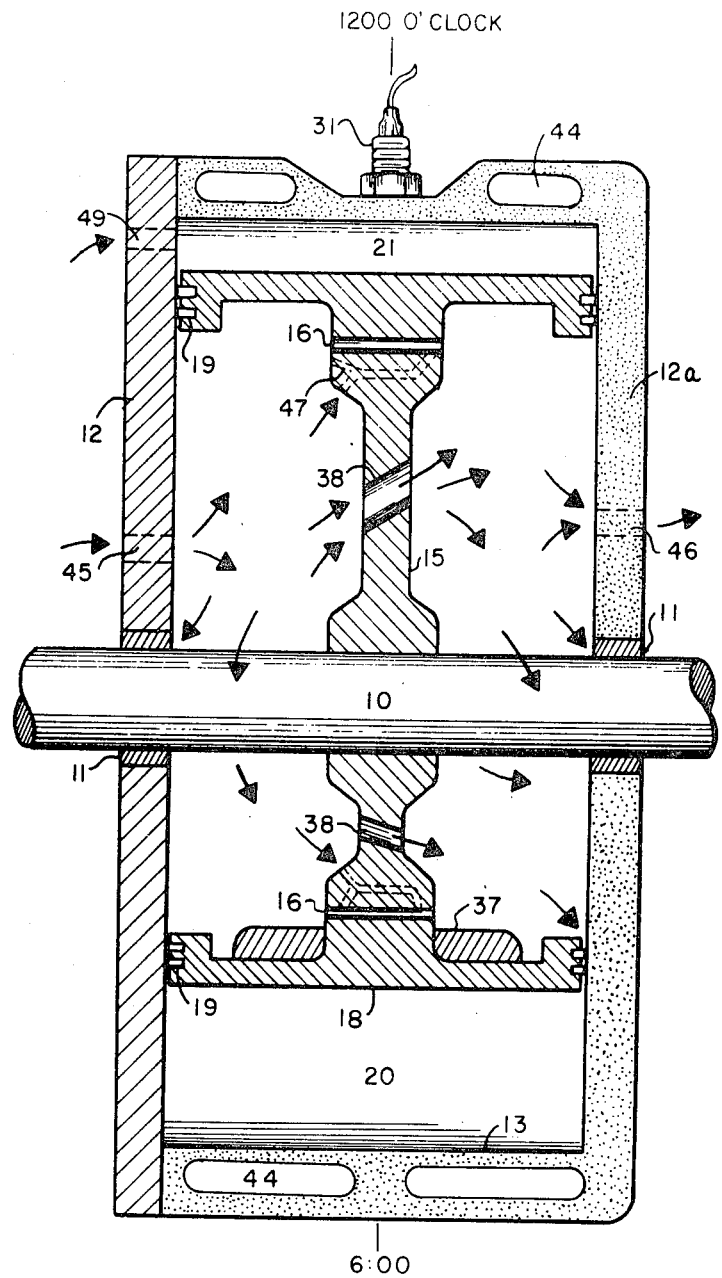
FIG. 3 is a cross-sectional side view of the invention engine of FIG. 1 at 12:00 o'clock showing skeletalized piston, with yieldable end seals (against end walls) and cooling oil forced through hollows of the piston and through holes in web of rotor.

This rotary engine has the four phases of intake, compression, expansion and exhaust with each revolution of the engine shaft. FIG. 1 shows a preferred embodiment with rotor head 17 at 12:00 o'clock, the point of maximum compression of a charge of air. (Since the piston head is common with the rotor head, it too shall be identified herein by the number 17.) Fuel now may be injected into combustion chamber 21a via port 59 in end plate 12 (FIG. 3) and ignited by one or more spark (or glow) plugs 31, or fuel optionally has already been injected at port 49 in end plate into inflowing compressed air, to be ignited by one or more spark (or glow) plugs 31. Compression charge is confined between abutments 22 and 23. After ignition, expanding gases bear against piston 18, which exerts downward pressure on rotor head 17, causing rotor 15 to rotate, and being keyed to engine shaft 10, the rotor converts the downward pressure into rotary motion. As rotor 15 advances clockwise, it sucks into the engine via intake port 35 and one-way inlet valve 36 air from the outside and at the same time compresses the air drawn in during the preceding revolution against abutment 22, which is held against piston 18 by preset spring tension and, throughout the power stroke, also by the pressure of expanding gases inside the combustion chamber. First abutment 22 is opened by cam 53a outside end wall 12 or, optionally, by compressed air when it reaches a predetermined psi. When the piston head reaches the end of the power stroke at a point preferably near 5:00 o'clock, cam 53 outside end plate 12 lifts swinging abutment 23 off piston 18 via lever 58 keyed to pivot hub 24, allowing spent gases to flow out of the combustion chamber into the space between the piston and the cylinder. These spent gases are deflected outside engine through port 32 by a thin rectangular strip of metal 33 which seals between the end walls, and is anchored by pivot to stator 14, and is spring biased against piston 18 by a spring outside the end wall via a lever keyed to hub 34 on end of pivot, which hub is journaled in the end wall. A jet of compressed air is admitted into the combustion chamber via a narrow cavity 91 hollowed out on the inner face of at least one end plate and so positioned that the free end of swinging abutment 22 lies across the cavity at the end of the power stroke immediately after exhaust port 32 opens, the jet of air being an aid to scavenging engine. Exhaust port 32 is closed by spring tension or optionally by cam action (FIG. 5), cam 53 so shaped as to quickly return abutment 23 to sealing position against piston 18.

Figure 8:
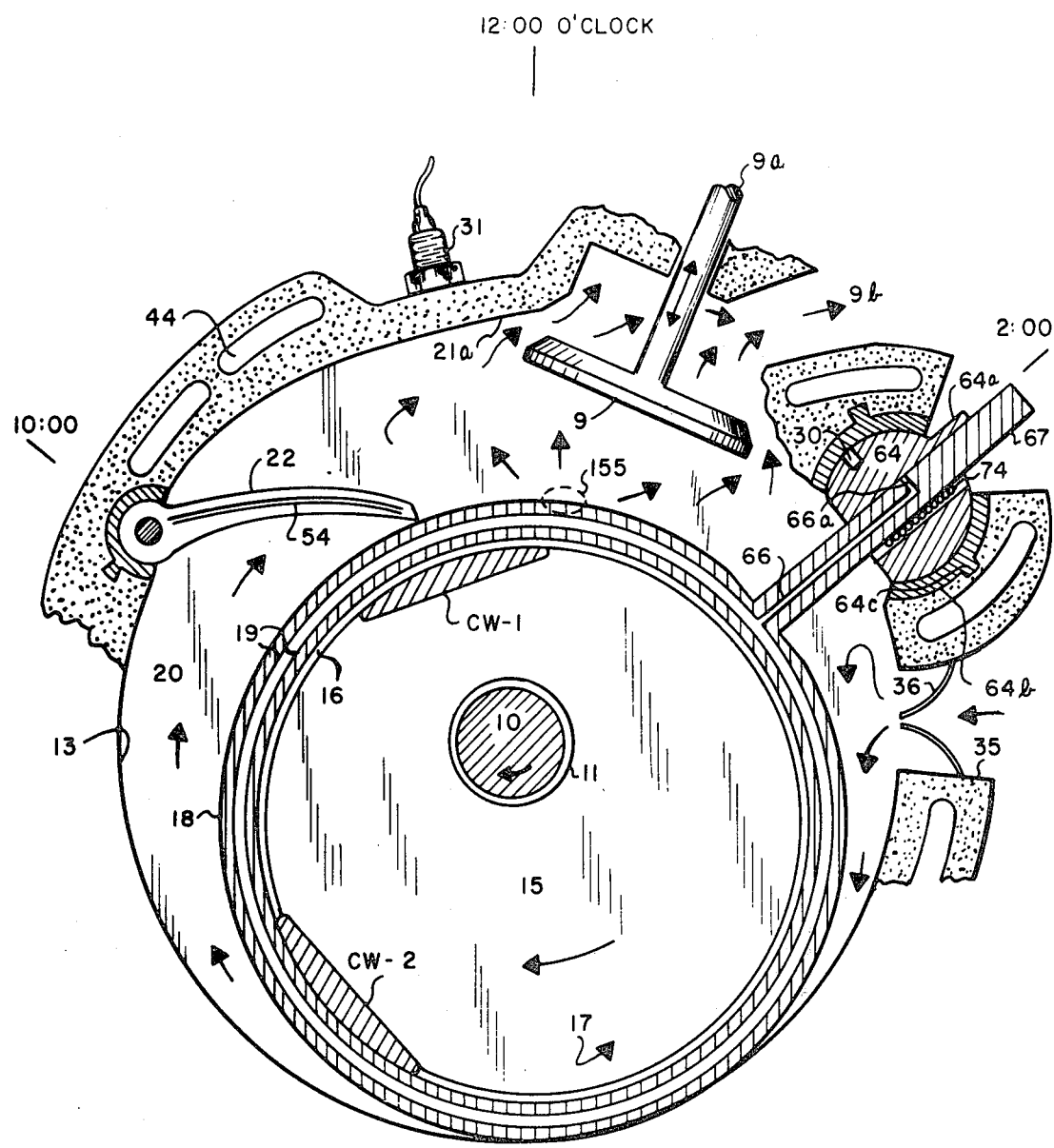
FIG. 8 is an end view of the invention engine with second abutment flexibly tethering piston to cylinder, with pivoting leaf abutment at counterclockwise end of combustion chamber and with poppet exhaust valve.

While the chief functions of this engine are the same in all combinations of first and second abutments and various exhaust means, the mechanical differences shown in FIG. 8 are considerable. The intake and compression action is the same as previously recited, but the second abutment comprises a metal plate 67 coextensive with the end walls, rigidly tethered to piston 18, and slidably reciprocating through a pivoting bearing 64 in stator 14, the mechanism allowing piston 18 to planetate as off-center rotor 15 rotates. Poppet valve 9 functions as exhaust port.

Figure 10:
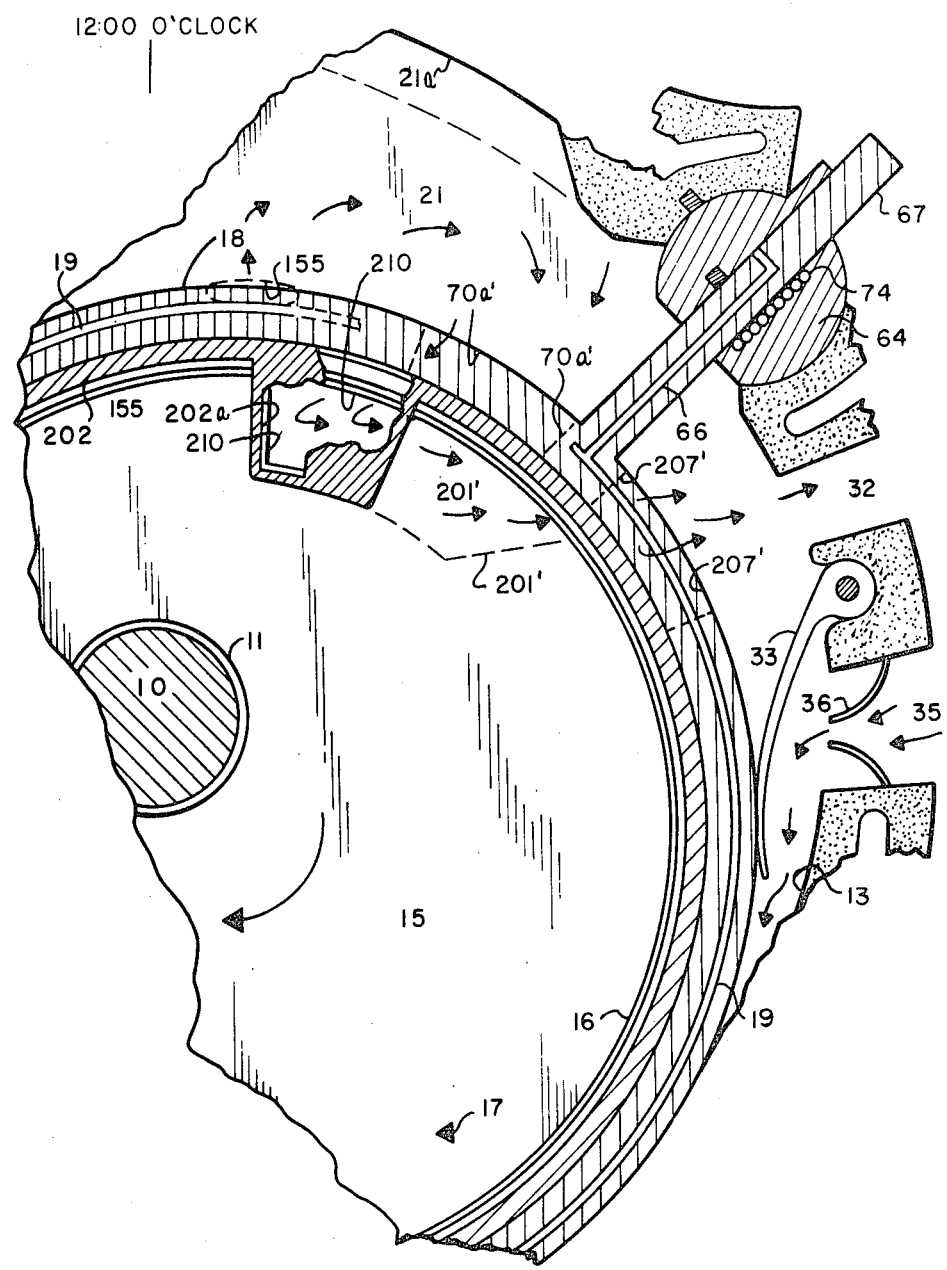
FIG. 10 is a fragmented end view with piston tethered as in FIG. 9, but an alternate means of venting engine in which an annular sleeve is bolted to each side of rotor to rotate closely inside piston but clearing piston, their edges clearing the end walls and an opening in face of piston immediately counterclockwise of second abutment, via which opening spent gases exhaust through a box carried by sleeve, which with proper timing, passes under said opening; thence out by a hole through rotor into a second box and forward on opposite side of rotor to a second opening clockwise of abutment in face of piston, the second opening being adjacent to exhaust port in engine housing.
Figure 14:
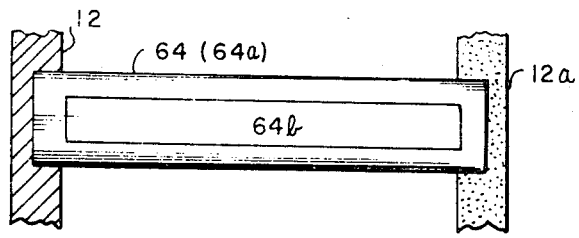
FIG. 14 is a fragment showing pivoting bearing mounted in housing with slot through which second abutment shown in FIG. 13 reciprocates.
Figure 12:
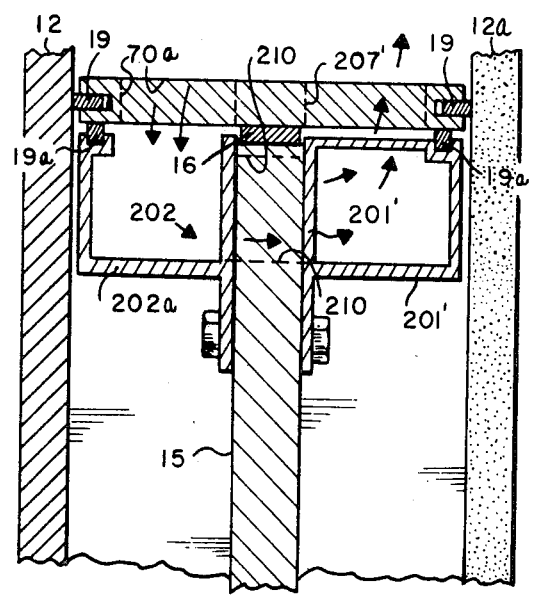
FIG. 12 is a fragmented side view showing the first box with spent gases flowing into it via opening in face of cylinder and out via hole in rotor as recited above.
Figure 11:
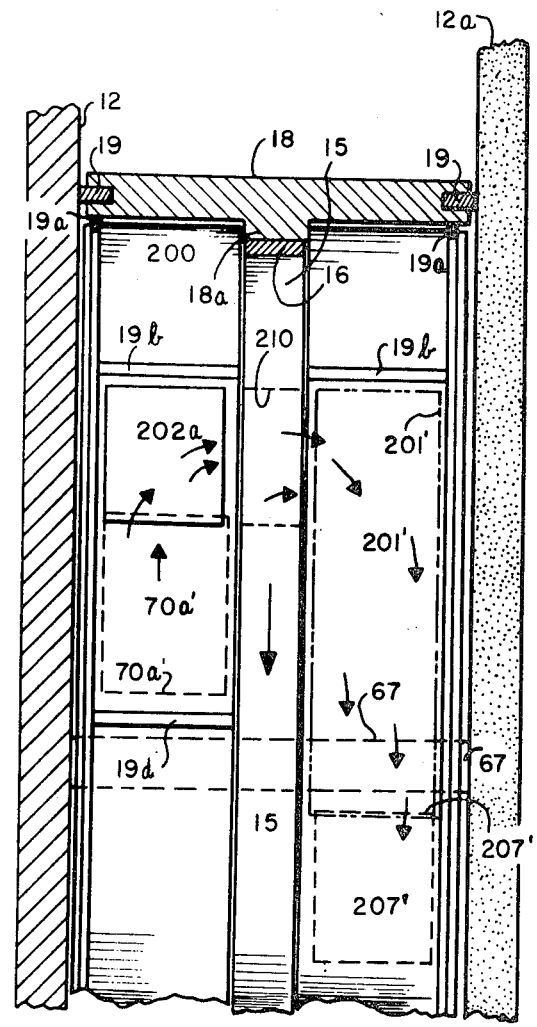
FIG. 11 is a side view of engine showing venting system shown in FIG. 10.

In the combination shown in FIGS. 10, 11, and 12, the intake and compression action is the same as recited above, but any of the first abutments can be used. The second abutment is rigidly fixed to the piston and reciprocates in a pivoting bearing 64 in stator 14 and the exhaust is by means fully automatic: the sleeve 202 bolted to each side of rotor 15 and rotating close to the underside of the planetating piston 18 allows the spent gases to spill out of expansion chamber 21 via a port 70a' in the face of piston 18 into a box 202a and through a hole 210 in rotor 15 adjacent to and connecting with box 202a, and thence into a second box 201' on an opposite side of rotor 15, the second box being elongated to extend forward and allow the spent gases to spill out to clockwise of second abutment 67 via port 207' in the face of piston 18 and out of the engine via exhaust port 32. Perimeter seals 19a and cross seals 19b make yieldable sealing contact with underside of piston 18. Additional cross seals may of course be provided as needed.

Since this engine fires every revolution, it is necessary to close the exhaust port quickly after the end of the expansion stroke before air compression reaches more than a few psi in the compression chamber. It may be noted that all exhaust means shown herein are designed to provide the required prompt closing so that a minimum of air will be forced through the expansion chamber, even when under maximum air charge.

It may be noted that when the engine is under very light load, with a minimum of air admitted to compression chamber 20, only a very small amount of air will be available to scavenge the engine. Not much air will be required, of course, when the combustion charge is very small. But auxiliary scavenging air can be provided by means entirely automatic by the device shown in FIG. 17. A small charge of compressed air is forced into storage tank 150 via the small pipe or tube 151 (which is fitted with a one-way valve at 153), through port 152 located near the clockwise end of compression chamber 20. The stored air is held in storage tank 150 by flange 19a on the edge of piston 18, which flange covers the discharge port 155 throughout combustion and until the end of the power stroke. Just after exhaust port (not shown in FIG. 17) opens, the rim of piston 18 passes downward uncovering port 155 and letting the compressed air spill into the expansion chamber.

In a variation of this means of cleansing the engine at the end of the power stroke, there is an adjacent pair of windows like 70a' (FIGS. 10, 11 and 12) in the face of piston 18 counterclockwise of abutment 67 and on opposite sides of rotor 15. An adjacent pair of similar windows in piston 18 like 207' are on the clockwise side of abutment 67 and on opposite sides of rotor 15. An adjacent pair of windows in rotating sleeves 202 are on opposite sides of rotor 15, each sleeve window subtending a box the same length and width as the window, its length being such that it exactly spans both piston windows in its path. Thus, when the sleeve windows begin to engage the piston windows on the counterclockwise side of abutment 67, spent gases in the combustion chamber begin to escape into the boxes and as soon as the boxes begin to engage the second pair of piston windows, they form two exhaust channels via which the spent gases pour out of the expansion chamber into the engine space clockwise of abutment, adjacent to the exhaust port. Yieldable seals are provided between the surfaces of the sleeves and the piston to prevent combustion gases from escaping except at the end of the expansion stroke and to again seal clockwise end of combustion-expansion chamber as soon as the sleeve boxes pass the pair of piston windows on the counterclockwise side of abutment 67.

Test engineers have been unable to seal rotary engines well enough to meet commercial requirements. Though Wankel is on the market in limited volume, and its end seals have proven satisfactory, its apex seals lose compression and they wear rapidly. A great many rotary engines shown in patent drawings depend only on contact between rotor and cylinder for sealing. Such contact sealing has been adequate for rotary air compressors up to about 300 psi; but it has not been satisfactory in containing combustion pressures which may range up to 2,000 psi. Numerous rotary designs depend on sliding vane or blade seals, but this type of sealing has proved unsatisfactory because the pressure of combustion gases against the sides of the vanes binds them in their slots.

It is believed that the only sealable type of rotary engine designed to-date is the type shown herein in which a first and a second abutment, together with the piston and cylinder, form a combustion chamber and also remain in contact with the cylinder and the piston throughout the expansion stroke. The design has additional virtues. It is simple, requiring a minimum of machining and materials. Most rotaries allow the expanding gases to flow around the rotor, pushing the rotor head. These, for the most part, provide also a widening expansion chamber, the volumetric clearance causing a loss of efficiency. Also, the combustion gases cool excessively as they flow against the cooling jacket. The invention engine confines the combustion gases to an expansion chamber which seems to be unique in internal combustion engines: one in which the cross-sectional area, instead of remaining the same as in a piston engine, or widening as in most rotaries, the expanding gases are confined to an area which actually narrows as the stroke advances, thus retaining the heat of combustion for a longer portion of the power stroke.

The design of the present invention engine also provides a great volume of air for the combustion chamber, since the gases of combustion are confined to the upper part of the cylinder, leaving more than three-fourths of the cylinder to function as an air compressor. This engine can inhale two and one-half to three times as much air as a piston engine of equal displacement (without a supercharger). The good sealing and the large quantity of air enables this engine to function as a diesel. The abundance of air also insures quick and thorough scavenging, even though this engine fires a charge every revolution. Having no cam shafts, cams, mountings, and a rotor which does not scrape the end walls, the invention engine obviously will be exceptionally quiet and smooth in operation, even though a diesel.

While the invention has been described in connection with the preferred embodiment, it is not intended to limit the invention to the particular forms set forth, but, on the contrary, it is intended to cover such alternatives, modifications, and equivalents as may be included within the spirit and scope of the invention as defined by the appended claims.

I claim:

1. A rotary internal combustion engine having a four-phase cycle of intake, compression, expansion and exhaust in each revolution of the engine shaft, the engine comprising:

a stator with a cylinder bore enclosed between end walls;

a power shaft in bearings journaled in the end walls and concentric with the cylinder bore;

an eccentric annular rotor keyed to the power shaft and positioned approximately midway between the end walls;

an annular piston coextensive with the end walls and fitted on the eccentric rotor and concentric with it, the piston and rotor having a common eccentric head, the piston head making tangential sealing engagement with the cylinder substantially throughout the cycle;

a first abutment having a first end pivotally secured to the stator near 10:00 o'clock and a second end free to project clockwise into the cylinder space far enough to make tangential, sealing engagement with the face of the piston in all positions of the piston, the abutment making sliding sealing engagement with both end walls and, during the combustion-expansion stroke, making sealing engagement with the face of the piston, thus forming the counterclockwise end of a combustion-expansion chamber for confining a charge of fuel throughout an expansion stroke and exerting pressure against the piston to cause the piston to force the eccentric rotor to rotate, the cylinder machined away along the edges of the pivot bore in the stator to permit the abutment to pivot inside the cylinder as the piston planetates, the abutment spring biased downward toward the face of the piston by a spring mechanism outside the engine, allowing a predetermined pressure in the compression chamber to force the abutment open and permit a charge of air to be compressed into the combustion chamber and to aid in holding the free end of the abutment in sealing engagement with the face of the piston at the end of the compression stroke;

a second abutment closing the clockwise end of the combustion-expansion chamber comprising a rectangular metal plate rigidly affixed to the piston and coextensive with the end walls and pointing radially outward from the center of the piston, the second abutment inserted through a slot in a pivoting bearing journaled in the stator near 2:00 o'clock to slidably reciprocate in the slot, the stator machined away along the edges of the bore for the pivoting bearing to enable the second abutment to swing clockwise and counter-clockwise as the piston planetates;

a combustion chamber comprising a shallow arcuate cavity in the stator centered near 12:00 o'clock and opening into and combining with the expansion chamber;

a suction chamber and a compression chamber, the suction chamber being the space behind the traveling piston head and the compression chamber being the space forward of the traveling piston head;

an air inlet port in the stator positioned in the vicinity of 3:00 o'clock, the port fitted with a one-way valve to admit air into the suction chamber as movement of the piston head generates a suction;

means for injecting a charge of fuel into the combustion chamber and means for firing the fuel charge in timed relation to the position of the piston head;

exhaust means for expelling spent gases from the combustion-expansion chamber at the end of the power stroke, the means comprising a poppet valve in the perimeter of the combustion chamber.

* * * * *